(12) United States Patent
Sato et al.

(10) Patent No.: US 7,003,557 B1
(45) Date of Patent: Feb. 21, 2006

(54) METHOD AND SYSTEM FOR RACING CONTROL OF OPERATIONS IN SYSTEM MANAGEMENT

(75) Inventors: Masayuki Sato, Kawasaki (JP); Akinori Kamijo, Kawasaki (JP); Keiji Mizuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/232,049

(22) Filed: Jan. 15, 1999

(30) Foreign Application Priority Data

May 8, 1998 (JP) .................................. 10-126486

(51) Int. Cl.
G06F 15/16 (2006.01)

(52) U.S. Cl. ...................................... 709/223; 719/319
(58) Field of Classification Search ................ 709/223, 709/316, 104, 102, 224, 226; 719/100, 102, 719/103, 104, 316; 707/203
See application file for complete search history.

(56) References Cited

U.S. PATENT DOCUMENTS

| | | | | |
|---|---|---|---|---|
| 5,455,914 A | * | 10/1995 | Hashemi et al. | 700/2 |
| 5,469,575 A | * | 11/1995 | Madduri | 707/3 |
| 5,519,867 A | * | 5/1996 | Moeller et al. | 709/103 |
| 5,715,472 A | * | 2/1998 | Meaney et al. | 709/226 |
| 5,752,038 A | * | 5/1998 | Blake et al. | 717/158 |
| 5,826,081 A | * | 10/1998 | Zolnowsky | 709/102 |
| 5,898,832 A | * | 4/1999 | Feridun | 709/203 |
| 6,125,442 A | * | 9/2000 | Maves et al. | 712/220 |
| 6,167,423 A | * | 12/2000 | Chopra et al. | 718/100 |
| 6,292,829 B1 | * | 9/2001 | Huang et al. | 709/223 |
| 6,370,681 B1 | * | 4/2002 | Dellarocas et al. | 717/110 |
| 2001/0052006 A1 | * | 12/2001 | Baker et al. | 709/223 |

FOREIGN PATENT DOCUMENTS

| JP | 3-211647 | * | 9/1991 |
|---|---|---|---|
| JP | 6-303288 | * | 10/1994 |

OTHER PUBLICATIONS

Objects to the rescue□□Andrew P. Black and Jonathan Walpole□□1994 ACM Press.*
Matha J. Kosa□□Making Operations of Concurrent Data Types Fast□□1994 ACM 0-89791-654-9.*

* cited by examiner

Primary Examiner—William C. Vaughn, Jr.
(74) Attorney, Agent, or Firm—Katten Muchin Rosenman LLP

(57) ABSTRACT

A system for fine racing control in system management between CMIP operations and operations under other protocols, including a system (HOST), a work station (OSIP), remote operating system (OS), a maintenance and management terminal (OAM), racing control units, a common racing control table, an operation registration table, a racing control table, and an operation registration table. The racing control units determine, regrading a newly requested operation, whether or not managed object instances or resources to be controlled corresponding thereto are the same, allow execution of the newly requested operation when they are different, and determine a possibility of execution of the newly requested operation by referring to the racing control table or the common racing control table when they are the same.

9 Claims, 17 Drawing Sheets

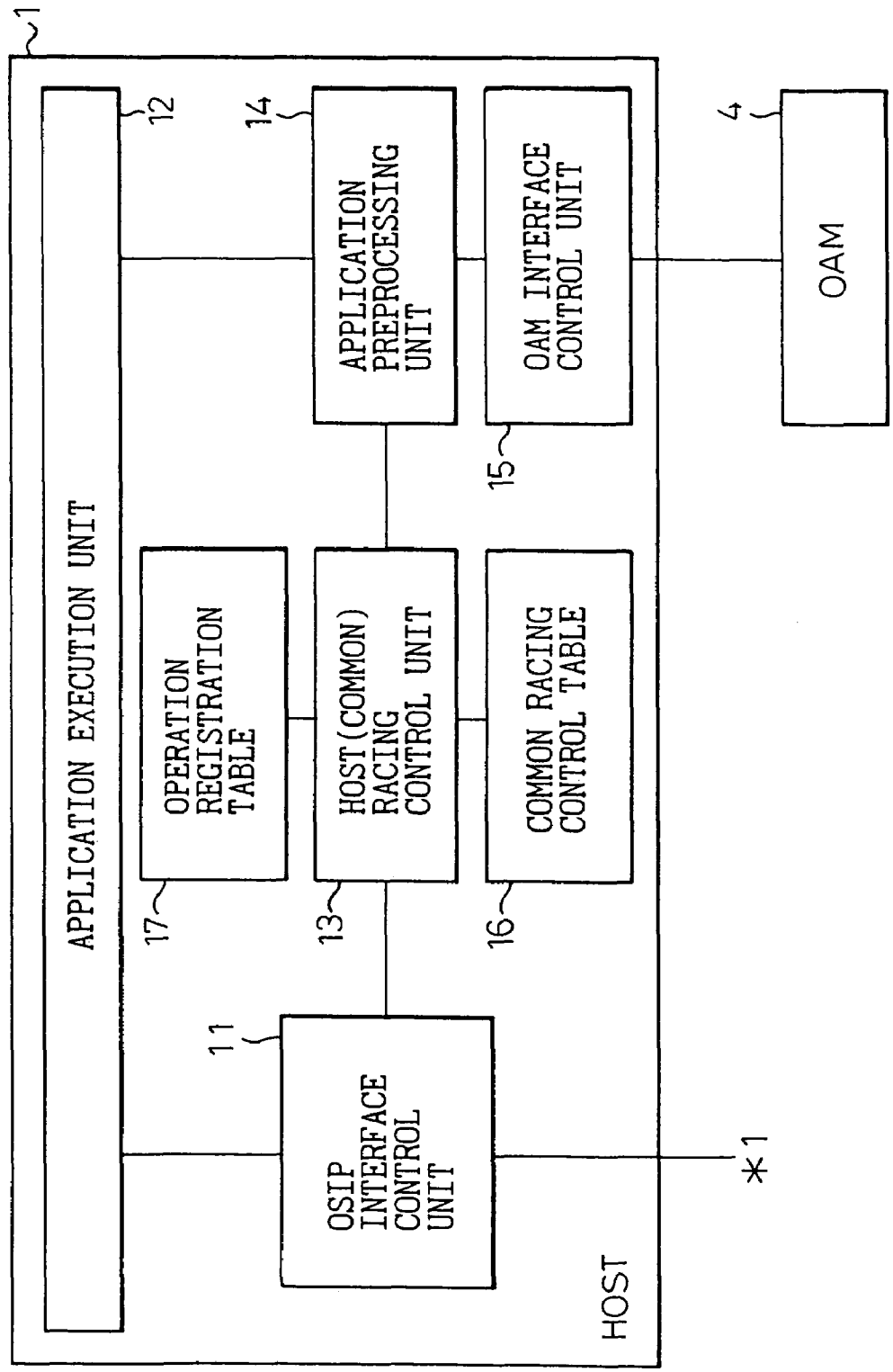

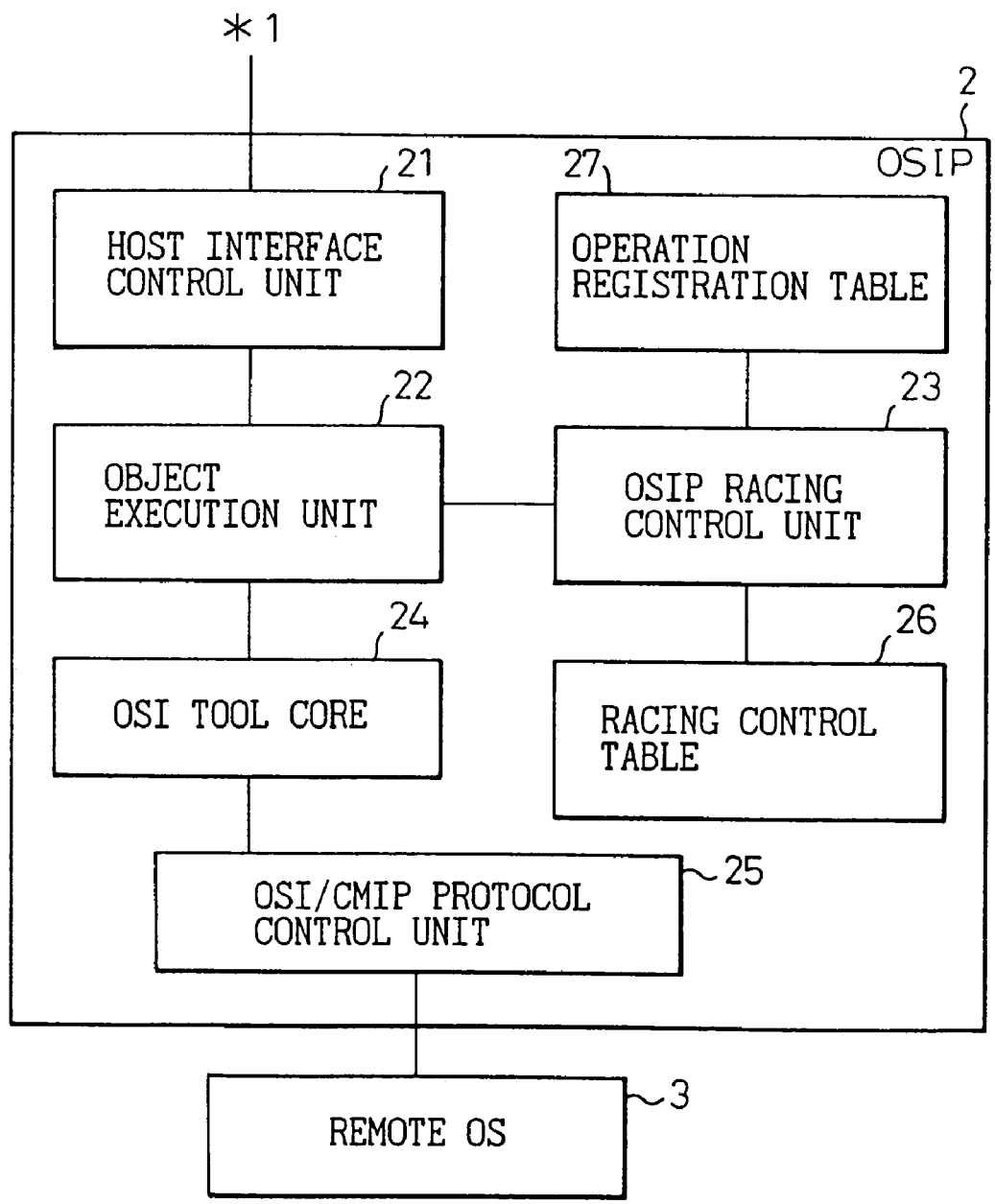

Fig.3

| CMIP OPERATION | VERB | CMIP OPERATION | VERB |
|---|---|---|---|
| M-GET | RETRIEVE (RTRV) | M-DELETE | DELETE (DLT) |
| M-CANCEL-GET | ABORT | M-SET | EDIT(EDT) REMOVE (RMV) RESTORE (RST) |
| M-CREATE | ENT | M-ACTION | TEST |

Fig.4A

| OPERATION BEING EXECUTED \ NEWLY REQUESTED OPERATION | M-CREATE | M-DELETE | M-SET | M-GET | M-ACTION |
|---|---|---|---|---|---|
| M-CREATE | (RACING CONTROL) PROCESSING FAILURE | OSI TOOL CORE ERROR:ALREADY CREATED | OSI TOOL CORE ERROR:ALREADY CREATED | OSI TOOL CORE ERROR:ALREADY CREATED | OSI TOOL CORE ERROR:ALREADY CREATED |
| M-DELETE | OSI TOOL CORE ERROR:NO SUCH INSTANCE | (RACING CONTROL) PROCESSING FAILURE | (RACING CONTROL) PROCESSING FAILURE | (RACING CONTROL) PROCESSING FAILURE | (RACING CONTROL) PROCESSING FAILURE |

Fig.4B

| OPERATION BEING EXECUTED / NEWLY REQUESTED OPERATION | M-CREATE | M-DELETE | M-SET | M-GET | M-ACTION |
|---|---|---|---|---|---|
| M-SET | OSI TOOL CORE ERROR:NO SUCH INSTANCE | (RACING CONTROL) PROCESSING FAILURE | (RACING CONTROL) PROCESSING FAILURE | (RACING CONTROL) NORMAL OPERATION CONTINUES | (RACING CONTROL) NORMAL OPERATION CONTINUES |
| M-GET | OSI TOOL CORE ERROR:NO SUCH INSTANCE | (RACING CONTROL) PROCESSING FAILURE | (RACING CONTROL) NORMAL OPERATION CONTINUES | (RACING CONTROL) NORMAL OPERATION CONTINUES | (RACING CONTROL) NORMAL OPERATION CONTINUES |
| M-ACTION | OSI TOOL CORE ERROR:NO SUCH INSTANCE | (RACING CONTROL) PROCESSING FAILURE | (RACING CONTROL) PROCESSING FAILURE | (RACING CONTROL) NORMAL OPERATION CONTINUES | (RACING CONTROL) NORMAL OPERATION CONTINUES |

Fig.5A

| NEWLY REQUESTED VERB \ VERB BEING EXECUTED | ENT | DLT | EDT, RST, RMV | RTRV | TEST |
|---|---|---|---|---|---|
| ENT | (RACING CONTROL) PROCESSING FAILURE | (RACING CONTROL) ERROR: ALREADY CREATED | (RACING CONTROL) ERROR: ALREADY CREATED | (RACING CONTROL) ERROR: ALREADY CREATED | (RACING CONTROL) ERROR: ALREADY CREATED |
| DLT | (RACING CONTROL) ERROR: NO SUCH INSTANCE | (RACING CONTROL) PROCESSING FAILURE | (RACING CONTROL) PROCESSING FAILURE | (RACING CONTROL) PROCESSING FAILURE | (RACING CONTROL) PROCESSING FAILURE |

Fig.5B

| VERB BEING EXECUTED \ NEWLY REQUESTED VERB | ENT | DLT | EDT, RST, RMV | RTRV | TEST |
|---|---|---|---|---|---|
| EDT, RST, RMV | (RACING CONTROL) ERROR: NO SUCH INSTANCE | (RACING CONTROL) PROCESSING FAILURE | (RACING CONTROL) PROCESSING FAILURE | (RACING CONTROL) NORMAL OPERATION CONTINUES | (RACING CONTROL) NORMAL OPERATION CONTINUES |
| RTRV | (RACING CONTROL) ERROR: NO SUCH INSTANCE | (RACING CONTROL) PROCESSING FAILURE | (RACING CONTROL) NORMAL OPERATION CONTINUES | (RACING CONTROL) NORMAL OPERATION CONTINUES | (RACING CONTROL) NORMAL OPERATION CONTINUES |
| TEST | (RACING CONTROL) ERROR: NO SUCH INSTANCE | (RACING CONTROL) PROCESSING FAILURE | (RACING CONTROL) PROCESSING FAILURE | (RACING CONTROL) NORMAL OPERATION CONTINUES | (RACING CONTROL) NORMAL OPERATION CONTINUES |

Fig.6A

| VERB BEING EXECUTED / NEWLY REQUESTED VERB | M-CREATE | M-DELETE | M-SET | M-GET | M-ACTION |
|---|---|---|---|---|---|
| M-CREATE | (RACING CONTROL) PROCESSING FAILURE | (RACING CONTROL) ERROR: ALREADY CREATED | (RACING CONTROL) ERROR: ALREADY CREATED | (RACING CONTROL) ERROR: ALREADY CREATED | (RACING CONTROL) ERROR: ALREADY CREATED |
| M-DELETE | (RACING CONTROL) ERROR: NO SUCH INSTANCE | (RACING CONTROL) PROCESSING FAILURE | (RACING CONTROL) PROCESSING FAILURE | (RACING CONTROL) PROCESSING FAILURE | (RACING CONTROL) PROCESSING FAILURE |

Fig.6B

| NEWLY REQUESTED VERB \ VERB BEING EXECUTED | M-CREATE | M-DELETE | M-SET | M-GET | M-ACTION |
|---|---|---|---|---|---|
| M-SET | (RACING CONTROL) ERROR: NO SUCH INSTANCE | (RACING CONTROL) PROCESSING FAILURE | (RACING CONTROL) PROCESSING FAILURE | (RACING CONTROL) NORMAL OPERATION CONTINUES | (RACING CONTROL) NORMAL OPERATION CONTINUES |
| M-GET | (RACING CONTROL) ERROR: NO SUCH INSTANCE | (RACING CONTROL) PROCESSING FAILURE | (RACING CONTROL) NORMAL OPERATION CONTINUES | (RACING CONTROL) NORMAL OPERATION CONTINUES | (RACING CONTROL) NORMAL OPERATION CONTINUES |
| M-ACTION | (RACING CONTROL) ERROR: NO SUCH INSTANCE | (RACING CONTROL) PROCESSING FAILURE | (RACING CONTROL) PROCESSING FAILURE | (RACING CONTROL) NORMAL OPERATION CONTINUES | (RACING CONTROL) NORMAL OPERATION CONTINUES |

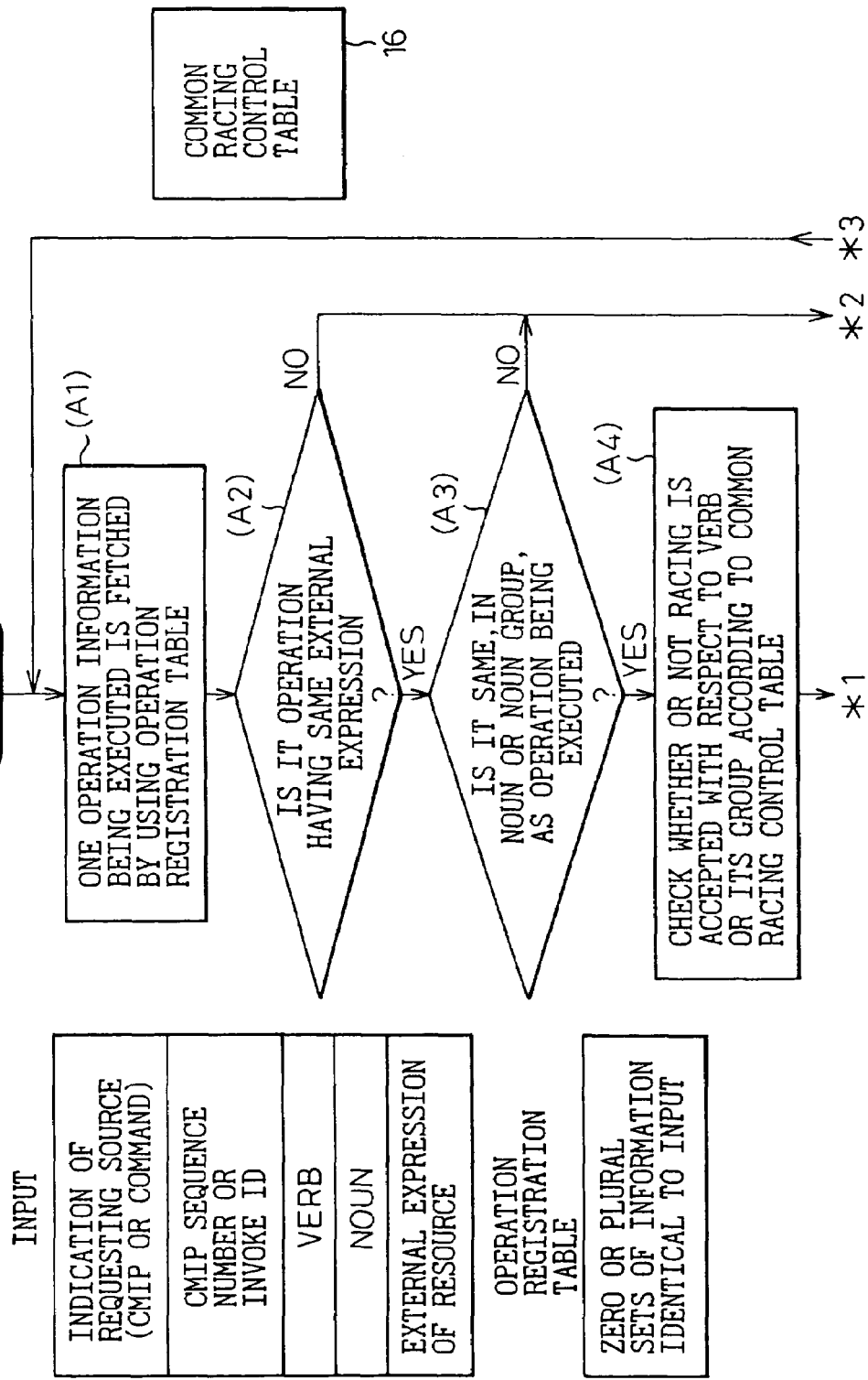

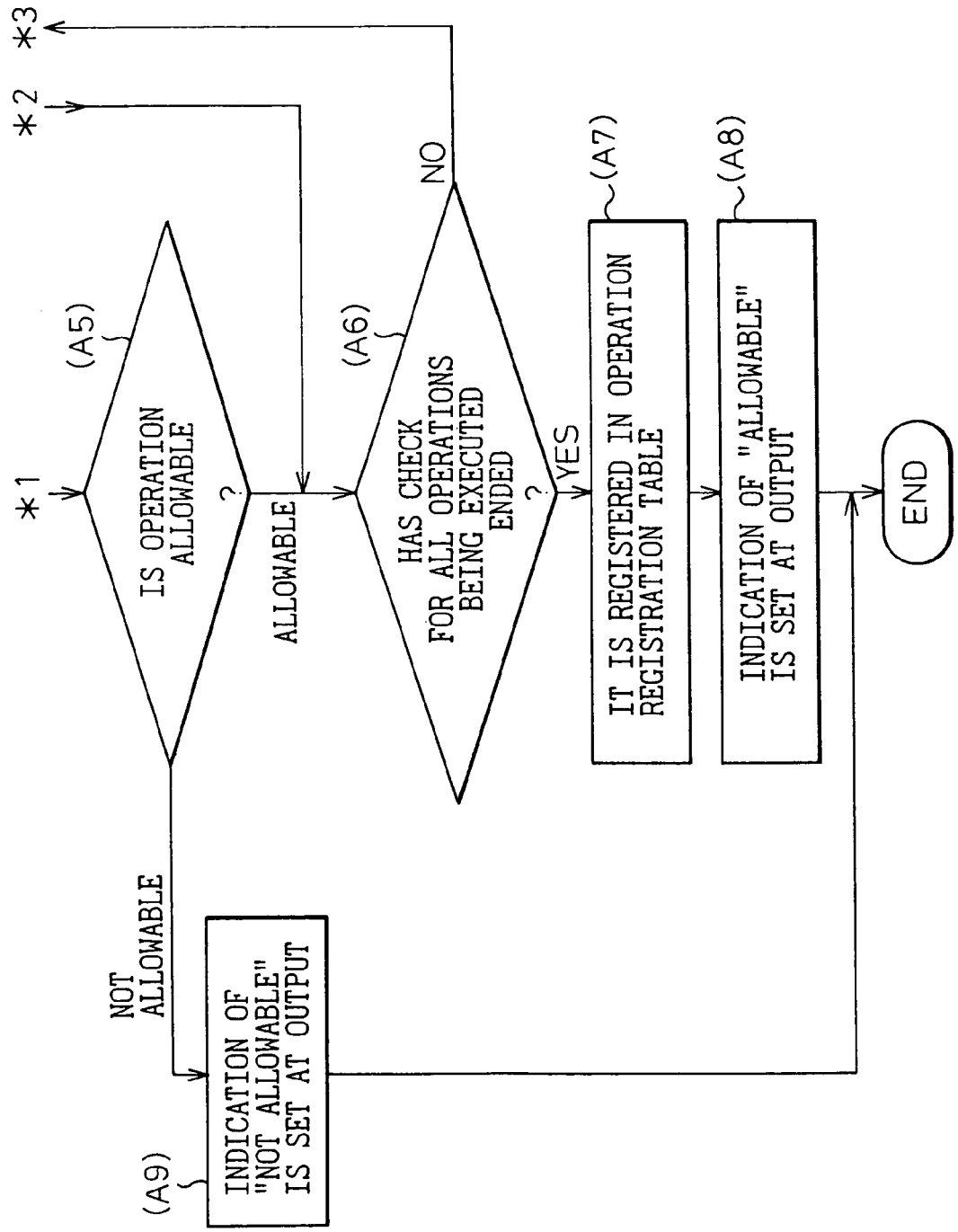

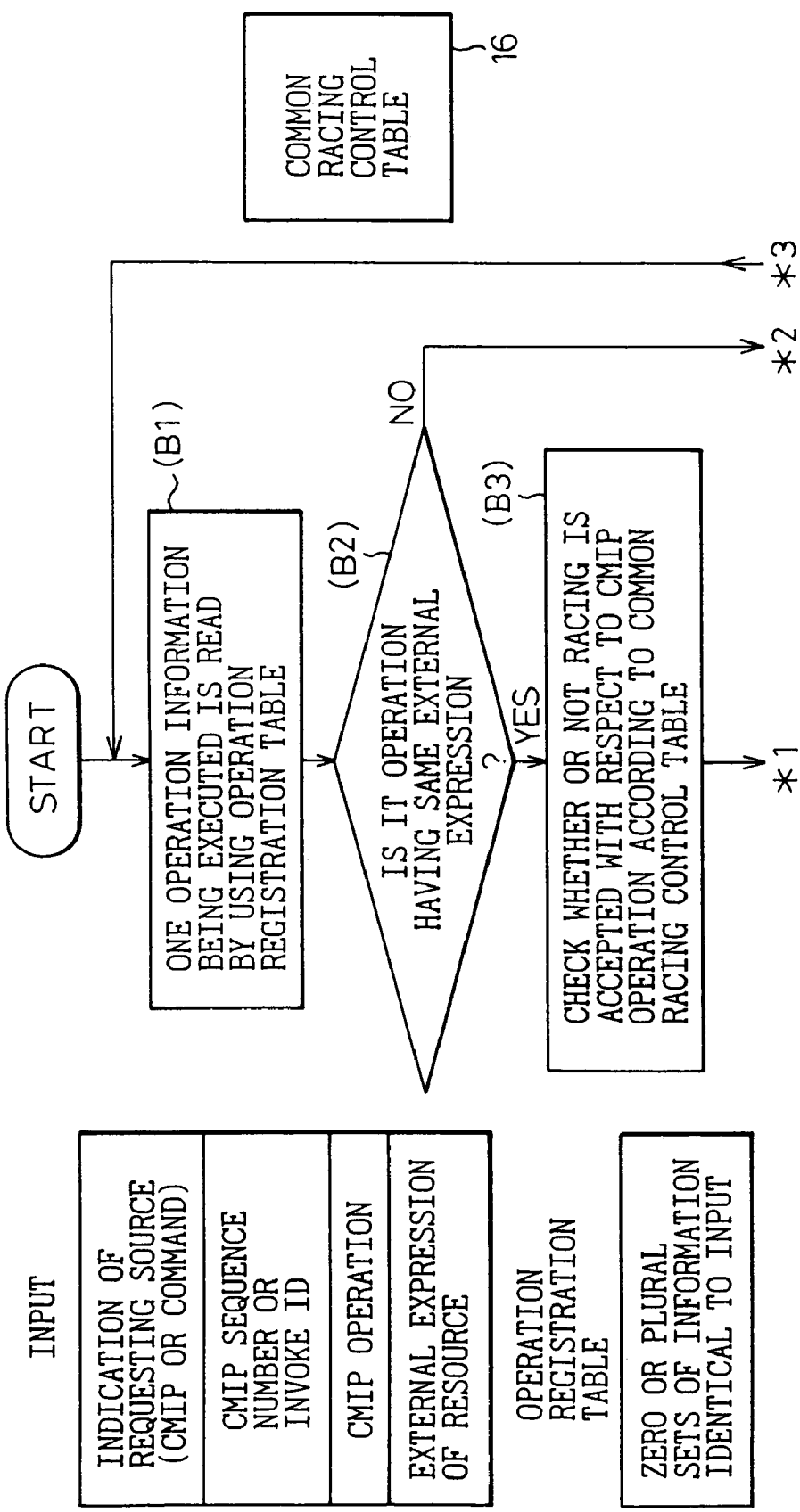

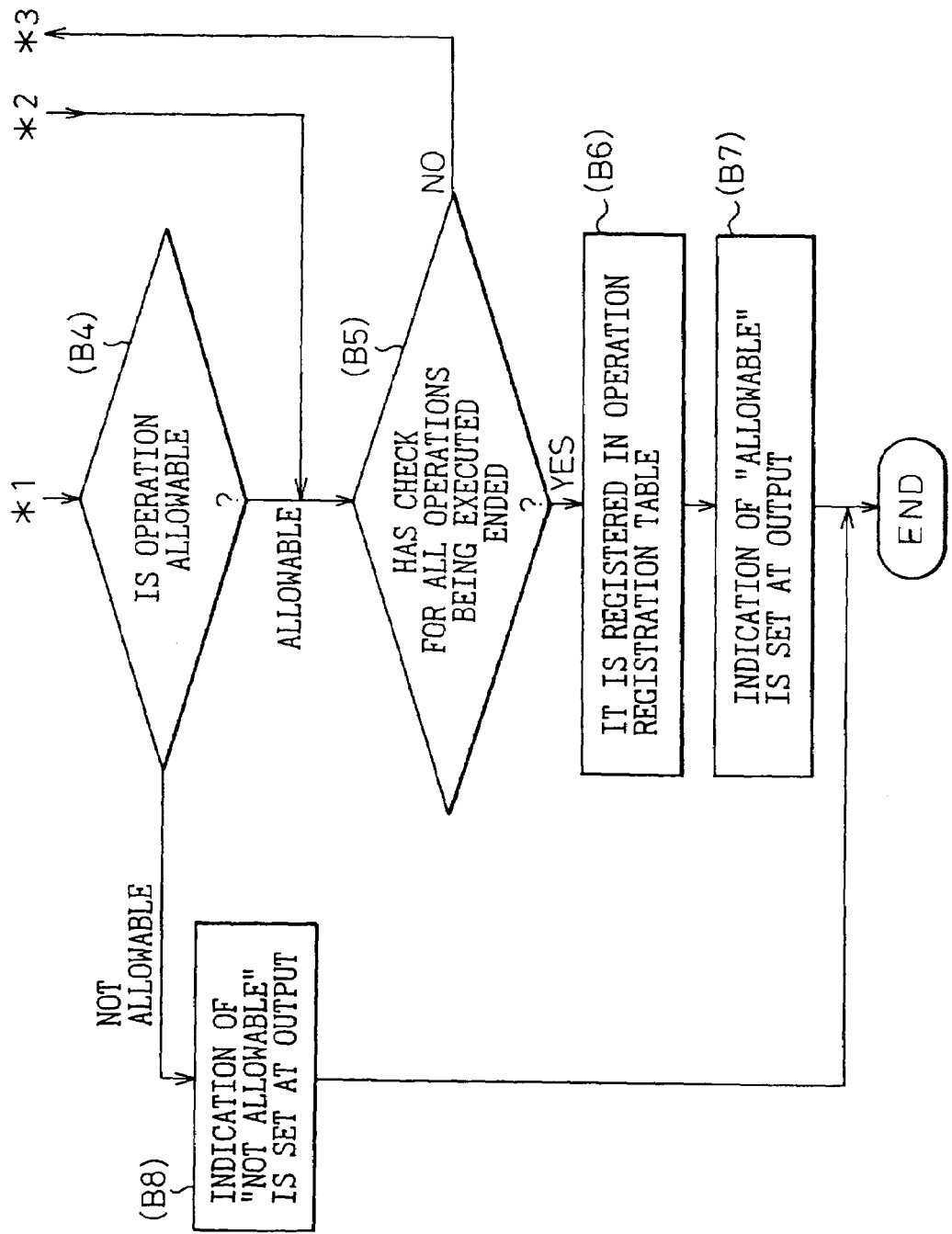

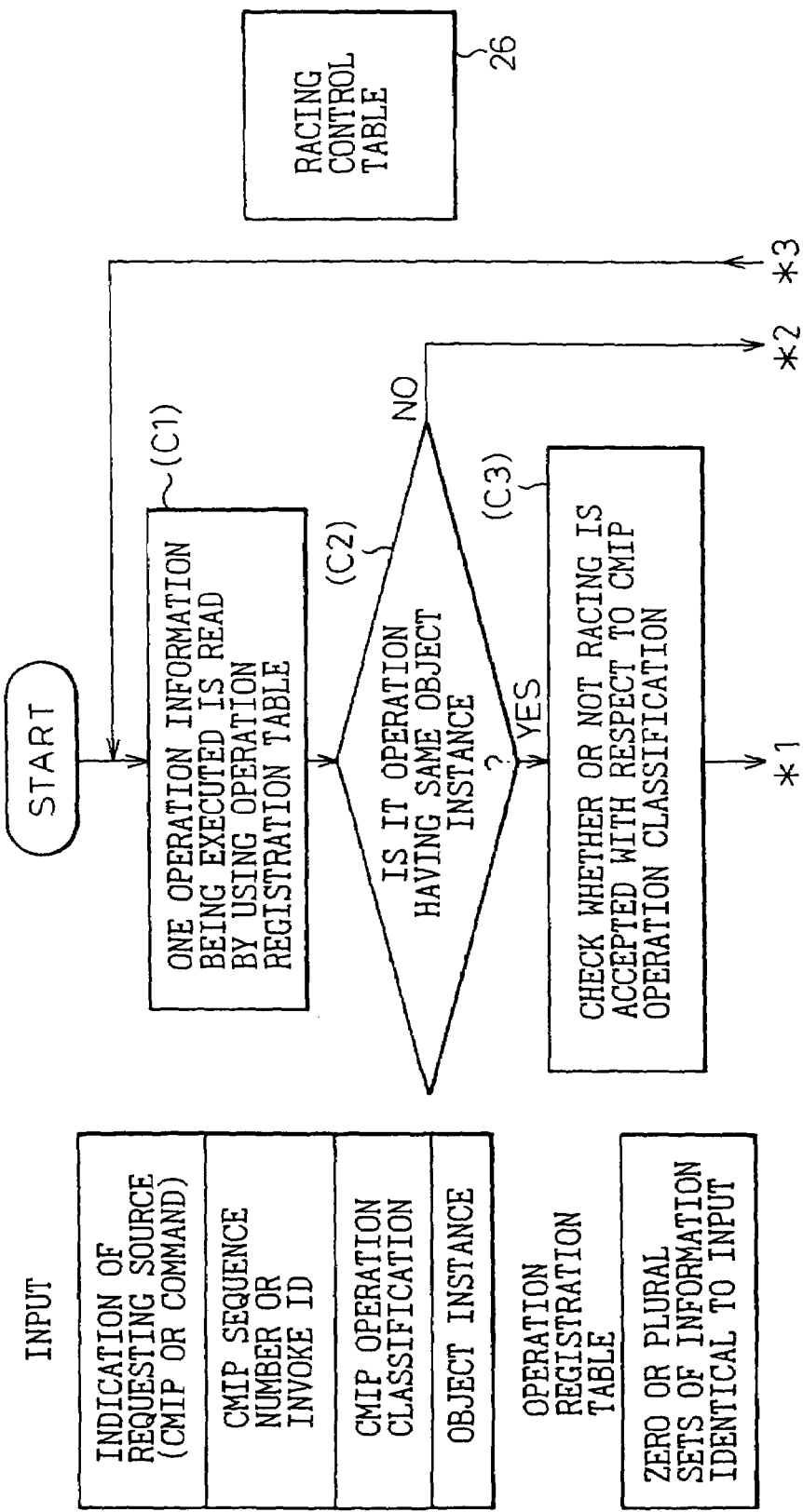

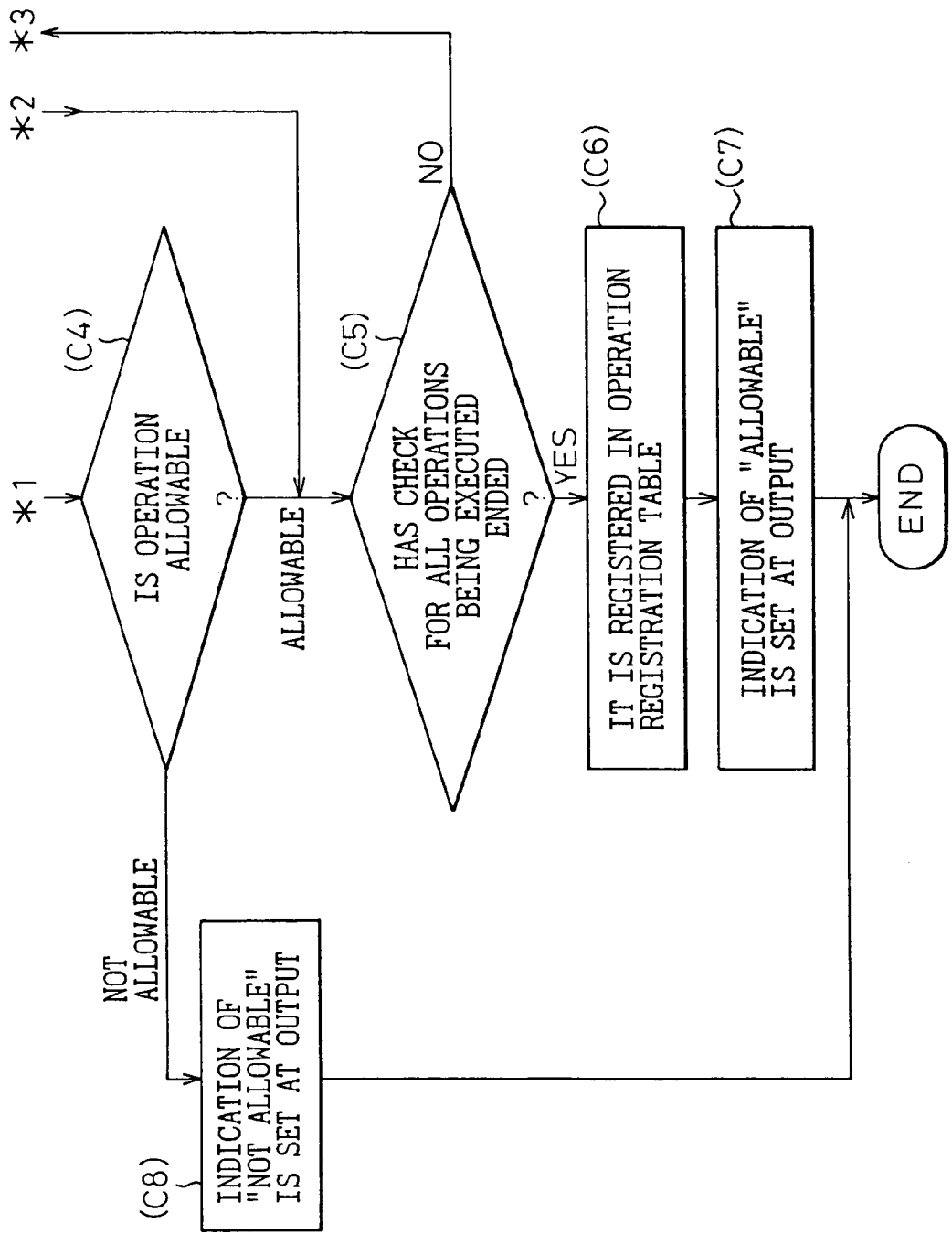

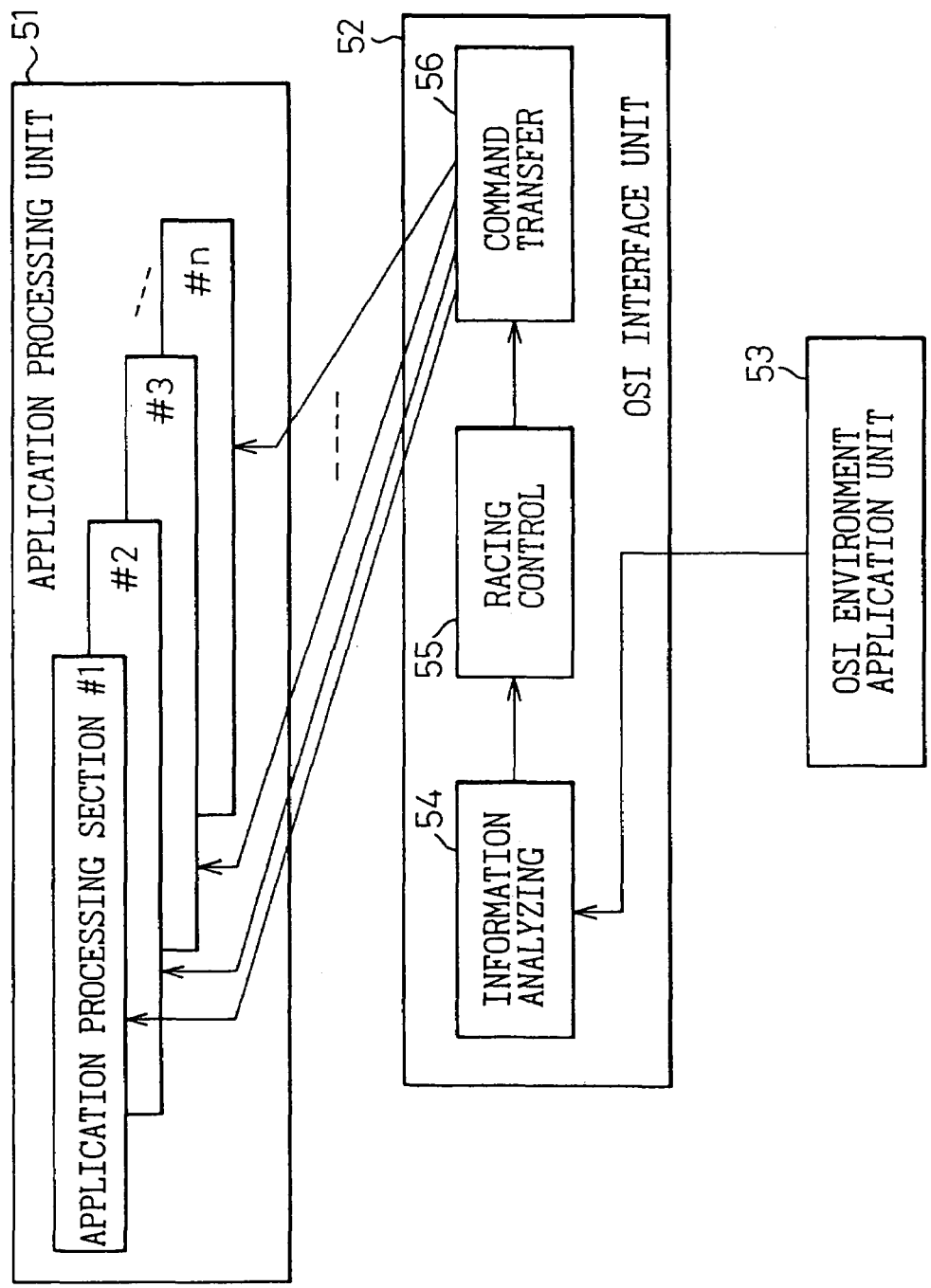

METHOD AND SYSTEM FOR RACING CONTROL OF OPERATIONS IN SYSTEM MANAGEMENT

BACKGROUND OF THE INVENTION

1. Field of the Invention

The present invention relates to a method and system for racing control of operations in system management.

In the maintenance and management of switching systems, transmission systems, network systems, and various other systems, various measures may be considered for dealing with operations newly requested for a controlled object the same as the controlled object of operations now being executed or a related controlled object, such as, (i) accepting it unconditionally, (ii) making it wait until the end of the operations now being executed, (iii) rejecting it unconditionally, and (iv) accepting it conditionally by racing control. Among these, the above measure of (iv) accepting it conditionally by racing control enables a smooth control in the system management. Among the above systems, there are systems adopting different protocols, but in such systems as well, it is desired to make racing control possible.

2. Description of the Related Art

As the protocol for managing switching systems, transmission systems, network systems, and other various systems, for example, there are the Transmission Control Protocol/Internet Protocol (TCP/IP), Simple Network Management Protocol (SNMP) in the Internet, Common Management Information Protocol (CMIP) as an Open System Interconnection (OSI) network management protocol, and various protocols unique to the system structure from the maintenance and management terminal by a work station etc.

Further, in the OSI model, there has been known a structure wherein the management side is defined as a "manager", a system side at which the switching, transmission apparatus, etc. are managed is defined as an "agent", a virtual data base of the information necessary for the management, that is, a management information base (MIB), is stored in this agent, a request for acquisition or setting the value of the object to be managed is made from the manager to the agent, and the agent responds to this request and notifies the manager of a generated event such as an abnormality occurring in the agent.

Further, as operations of the above SNMP, there are (1) "GET REQUEST" indicating reading of data of a specified MIB modification from the MIB, (2) "GET NEXT REQUEST" indicating reading of data next to the specified MIB modification in accordance with the order of the MIB, (3) "SET REQUEST" indicating setting a MIB modification to a specified value, (4) "GET RESPONSE" indicating a response from the agent to the request, and (5) "TRAP" indicating notification of the occurrence of an abnormality or event from the agent to the manager. Basically, the manager performs polling with respect to the agent.

Further, there has been known a management system using a Common Management Information Protocol/Common Information Management Service (CMIP/CMIS) specified by the OSI model. The Common Information Management Service (CMIS) can be roughly classified into management operation services from the manager to the agent and notification services from the agent to the manager. The services may be summarized as (1) "M-GET" indicating the reading of an attribute value of a managed object, (2) "M-SET" indicating the setting and alteration of an attribute value (replacement of an attribute value, addition of an attribute value, removal of an attribute value, and setting of an attribute value at default) of an object to be managed, (3) "M-ACTION" indicating an instruction for action on a managed object, (4) "M-CREATE" indicating creation of a managed object, (5) "M-DELETE" indicating deletion of a managed object, (6) "M-CANCEL-GET" indicating cancellation of the previous M-GET operation, and (7) "M-EVENT-REPORT" for reporting a state transition, error, etc. occurring in a managed object.

Further, in multiple operations under the CMIP, since there are no ID's for racing decision included in commands under the CMIP, some sort of racing control becomes necessary. Therefore, in the related art, an OSI interface apparatus for translating CMIP operations into internal commands and performing racing control while treating the commands as commands groups has been proposed (refer for example to Japanese Unexamined Patent Publication (Kokai) No. 6-303288).

In recent years, progress has been made in standardization of managed object models. Along with this, maintenance and management interfaces for communication systems, transmission systems, and other systems are now being adopted as interfaces based on standardized object models in addition to formats inherent to the manufacturers or formats peculiar to the management system.

Further, orderly execution of the operations for system management requires racing control between commands. In CMIP operations as well, it would be effective to carry out racing control at a stage before the operations. Since however the unit of processing, in principle, becomes the unit of an object instance showing the actual form of a controlled object in the OSI model, control from a viewpoint different from the racing control between commands becomes necessary.

Looking at racing control in such CMIP operations, in the related art mentioned above, CMIP operations are translated into internal commands including commands identification information and racing control is carried out between commands groups to which that internal commands belong. Accordingly, the processing is increased for translating operations to internal commands and racing decisions cannot be carried out in units of object instances, so there is a problem in that racing could not be sufficiently controlled.

Further, in systems for supporting CMIP operations as well, it is also necessary to execute operations of a format inherent to the manufacturer or a format peculiar to the system, that is, inherent to the system. In this case, orderly execution of both CMIP operations and operations inherent to a system based on other protocols requires racing control between these operations. There has not, however, been any solution of this point in the related art.

SUMMARY OF THE INVENTION

An object of the present invention is to perform fine racing control between CMIP operations, for example, in units of the smallest instance, and perform racing control of operations including operations by other protocols.

To attain the above object, according to a first aspect of the present invention, there is provided a method of racing control comprising the steps of determining, regarding newly requested operations under the Common Management Information Protocol (CMIP) defined by an Open System Interconnection (OSI) model, whether or not a managed object instance of operations now being executed and a managed object instance specified by the newly requested operations are the same. When the instances are different, it allows execution of the newly requested operations, while when the instances are the same, it refers to a racing control table formed based on a combination of operation classifications to determine whether it is possible to execute the newly requested operations. Accordingly, racing control of CMIP operations can be finely and quickly carried out with units of managed object instances.

According to a second aspect of the present invention, there is provided a method comprising the steps of determining, regarding either one of the newly requested operations of operations under the CMIP defined by the OSI model and operations inherent to the system, whether or not an external expression establishing correspondence between managed object instances of CMIP operations and resources to be controlled of operations inherent to the system is the same as the external expression of the operations now being executed. When they are different, it allows the execution of the newly requested operations, while when they are the same, it establishes correspondence of the classification of CMIP operations with a classification of control of operations inherent to the system and refers to a common racing control table formed based on combinations of the latter classifications of control to decide whether it is possible to execute the newly requested operations. By this, fine racing control becomes possible with respect to CMIP operations and operations inherent to the system as well.

According to a third aspect of the present invention, there is provided a method comprising the steps of determining, regarding either one of the newly requested operations of operations under the CMIP defined by the OSI model and operations inherent to the system, whether or not an external expression establishing correspondence between managed object instances of CMIP operations and resources to be controlled of operations inherent to the system is the same as the external expression of the operations now being executed. When they are different, it allows the execution of the newly requested operations, while when they are the same, it establishes correspondence of the classification of CMIP operations with the classification of control of operations inherent to the system and refers to a common racing control table formed based on combinations of the former classifications of operations to determine whether it is possible to execute the newly requested operations.

According to a fourth aspect of the present invention, there is provided a racing control system in system management by CMIP operations defined by a OSI model, provided with an operation registration table for registering operations now being executed; a racing control table for storing information of whether or not newly requested operations may be executed in the form (matrix) of combinations of classifications of newly requested and now being executed CMIP operations; and a racing control unit (OSIP racing control unit) including a first means for extracting operations now being executed from the operation registration table upon newly requested operations, a second means for determining whether or not the managed object instance of the operations now being executed extracted by this first means and the managed object instance of the newly requested operations are the same, and a third means for, when it is determined by this second means that they are the same, determining whether or not newly requested operations can be executed by referring to the racing control table.

According to a fifth aspect of the present invention, there is provided a racing control system in system management by CMIP operations defined by the OSI model and operations inherent to the system provided with an operation registration table for registering operations now being executed; a common racing control table for establishing correspondence between classifications of operations of CMIP and classification of control of operations inherent to the system and storing information on whether or not newly requested operations may be executed; and a racing control unit (HOST racing control unit) including a fourth means for extracting operations now being executed from the operation registration table upon newly requested operations, a fifth means for determining whether or not the external expression corresponding to the managed object instance of the operations now being executed extracted by this fourth means and the external expression of the newly requested operations are the same, and a sixth means for, when it is determined that they are the same by this fifth means, determining whether the newly requested operations may be executed by referring to the common racing control table.

According to a sixth aspect of the present invention, the common racing control table is structured to establish correspondence for classifications of control of operations inherent to the system with classifications of operations of the CMIP and store information of whether newly requested operations may be executed in the form of combinations of classifications of operations now being executed and classifications of newly requested operations.

According to a seventh aspect of the present invention, the common racing control table is structured to establish correspondence for classifications of operations of the CMIP with classifications of control of operations inherent to the system and store information of whether or not newly requested operations may be executed in the form of combinations of classifications of control of operations now being executed and classifications of control of newly requested operations.

According to an eighth aspect of the present invention, the racing control unit (HOST racing control unit) is structured to determine, regarding CMIP operations and operations inherent to the system, whether or not newly requested operations may be executed, based on identity of expressions of resources to be controlled, identity or resemblance of categories of resources to be controlled, and the classifications of control or groups of classifications of control of operations now being executed and newly requested operations.

BRIEF DESCRIPTION OF THE DRAWINGS

The above object and features of the present invention will be more apparent from the following description of the preferred embodiments given with reference to the accompanying drawings, wherein:

FIGS. 1A and 1B are explanatory views of the configuration of an embodiment of the present invention;

FIG. 3 is an explanatory view of an example of correspondence between CMIP operations and commands (verb);

FIGS. 4A and 4B are explanatory views of a racing control table according to an embodiment of the present invention;

FIGS. 5A and 5B are explanatory views of a common racing control table according to an embodiment of the present invention;

FIGS. 6A and 6B are further explanatory views of the common racing control table according to an embodiment of the present invention;

FIGS. 7A and 7B are flow charts of a first example of the present invention;

FIGS. 8A and 8B are flow charts of a second example of the present invention;

FIGS. 9A and 9B are flow charts of a third example of the present invention; and FIG. 10 is an explanatory view of the related art.

DESCRIPTION OF THE PREFERRED EMBODIMENTS

Figure 2:
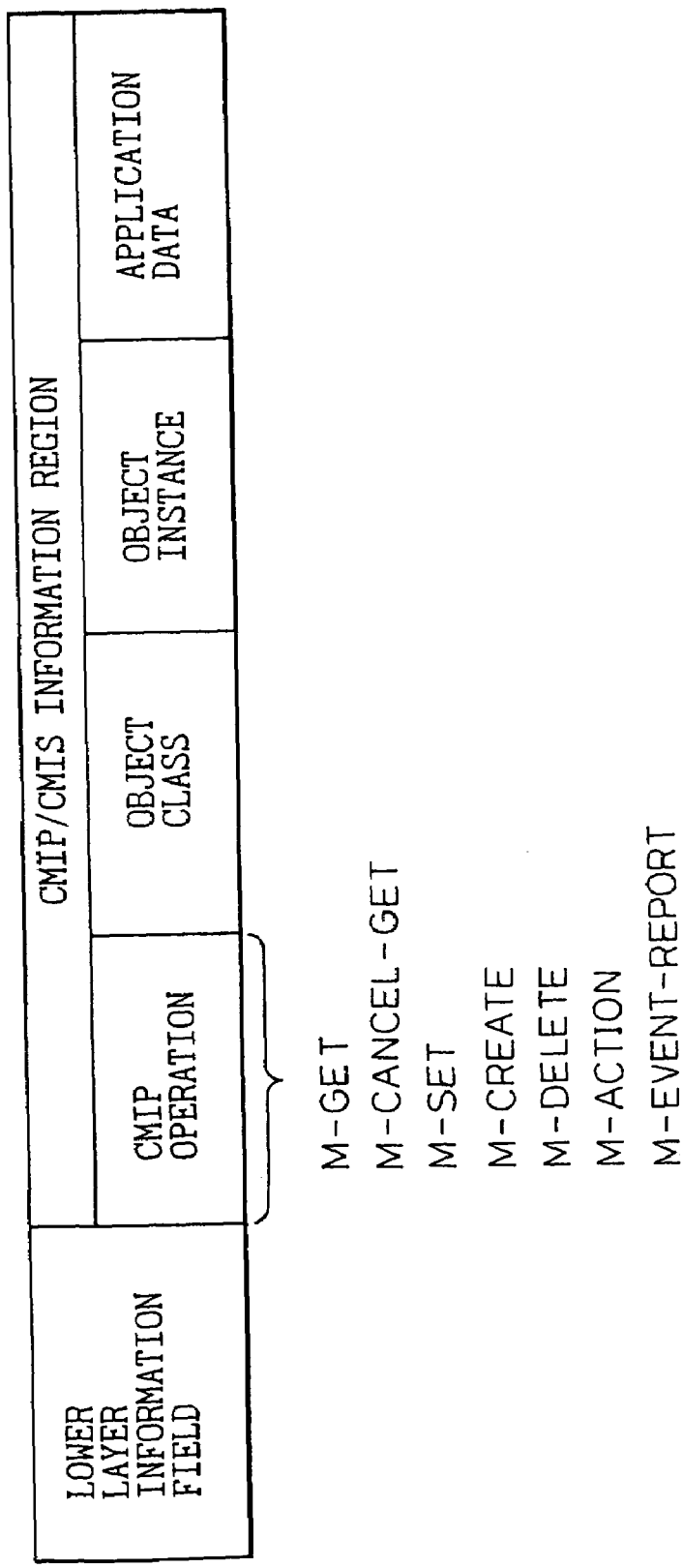
FIG. 2 is an explanatory view of a format of commands.

Before describing the embodiments of the present invention, the related art and the disadvantages therein will be described in further detail with reference to the related figures.

FIG. 10 is an explanatory view of a related art and shows in brief an OSI interface apparatus shown in Japanese Unexamined Patent Publication (Kokai) No. 6 -303288 explained above. An application processing unit 51 includes a plurality of application processing sections #1 to #n, while an OSI interface unit 52 includes an information analyzing means 54, a racing control means 55, and a commands transfer means 56 and receives CMIP commands from an OSI environment application unit 53 by the information analyzing unit 54 in the OSI interface unit 52.

This information analyzing means 54 analyzes received CMIP commands according to an analyzing algorithm to generate internal commands. Further, the racing control means 55 is provided with an execution status table (not illustrated) for registering commands now being executed in units of commands groups to which the commands belong and a racing relational table (not illustrated) for establishing correspondence by classifying commands into groups of the same racing relationships.

This racing control means 55 refers to the racing relational table regarding the internal commands generated in the information analyzing means 54 and determines whether or not the racing relational group includes the command group now being executed. If there is no racing relationship, it transfers the commands from the command transfer means 56 to the predetermined application processing section and establishes an in-execution flag in the execution status table with the unit of the command group. By referring to this execution status table, the command group now being executed can be identified.

As already explained, in recent years, progress has been made in the standardization of managed object models. Along with this, maintenance and management interfaces for communication systems, transmission systems, and other systems are now being adopted as interfaces based on standardized object models in addition to formats inherent to the manufacturers or formats peculiar to the management system.

Further, as already explained, orderly execution of the operations for system management requires racing control between commands. In CMIP operations as well, it would be effective to carry out racing control at a stage before the operations. Since however the unit of processing, in principle, becomes the unit of an object instance showing the actual form of a controlled object in the OSI model, control from a viewpoint different from the racing control between commands becomes necessary.

Looking at racing control in such CMIP operations, in the related art mentioned above, CMIP operations are translated into internal commands including commands identification information and racing control is carried out between commands groups to which that internal commands belong. Accordingly, the processing is increased for translating operations to internal commands and racing decisions cannot be carried out in units of object instances, so there is a problem in that racing could not be sufficiently controlled.

Further, in systems for supporting CMIP operations as well, it is also necessary to execute operations of a format inherent to the manufacturer or a format peculiar to the system, that is, inherent to the system. In this case, orderly execution of both CMIP operations and operations inherent to a system based on other protocols requires racing control between these operations. There has not, however, been any solution of this point in the related art.

In consideration with the above problem, the present invention enables fine racing control between CMIP operations, for example, in units of the smallest instance and, at the same time, racing control of operations including operations by other protocols. Below, a detailed explanation will be given of embodiments of the invention.

FIG. 1 is a view explaining the configuration of an embodiment of the present invention, in which 1 denotes a switching, transmission apparatus, network containing them, and other system (HOST) performing application processing, 2 a work station (OSIP: OSI Processor), 3 a remote operation system (remote OS), 4 a maintenance and management terminal (OAM or so-called Operation Administration and Maintenance), 11 an OSIP interface control unit, 12 an application execution unit, 13 a HOST (COMMON) racing control unit, 14 an application preprocessing unit, 15 an OAM interface control unit, 16 a common racing control table, 17 an operation registration table, 21 a HOST interface control unit, 22 an object execution unit, 23 an OSIP racing control unit, 24 an open system interconnection tool core unit (OSI TOOL CORE), 25 an OSI/CMIP protocol control unit, 26 a racing control table, and 27 an operation registration table.

The remote OS 3 corresponds to a centralized management system etc. for centrally performing maintenance and management of, for example, the switching system, transmission system, network system, or other system 1. Further, the remote OS 3 corresponds to the manager side in the OSI model, while the system 1 and the work station 2 correspond to the agent side in the OSI model. Further, the maintenance and management terminal 4 is a terminal for performing system management by commands inherent to the system.

Further, the work station (OSIP) 2 includes the HOST interface control unit 21, object execution unit 22, OSIP racing control unit 23, open system interconnection tool core unit 24, OSI/CMIP protocol control unit 25, racing control table 26, operation registration table 27, etc. The OSI/CMIP protocol control unit 25 transfers common management information service (CMIS) messages with the remote OS 3 by the CMIP with the support of the lower layer. For example, it transfers messages indicated in the CMIP operation shown in FIG. 2.

Further, the open system interconnection tool core unit (OSI TOOL CORE) 24 is provided with a function for analyzing the CMIP/CMIS information field of the format shown in FIG. 2, extracting the basic information, and sending an error message, without performing racing control in the OSIP racing control unit 23, regarding both a predetermined classification of operations now being executed and a predetermined classification of newly requested operations.

Further, the object execution unit 22 activates the OSIP racing control unit 23 and controls the managed object instance based on the result of the racing control by this OSIP racing control unit 23. When a link with the system 1 is necessary, it transfers control information with the system 1 via the HOST interface control unit 21. Further, the OSIP racing control unit 23 performs racing control of CMIP operations by referring to both the operation registration table 27 registering operations now being executed and the racing control table 26 storing the information of racing decisions in the form of combinations of classifications of operations.

The OSIP interface unit 11 also controls the transfer of information between the system 1 and the work station 2, performs control for absorbing the difference of units of processing of applications, and sends the CMIP operations found to be executable as a result of the racing control by the HOST racing control unit 13 to the application execution unit 12 and thereby it makes to execute the operations.

Further, the HOST racing control unit 13 refers to both the operation registration table 17 registering operations now being executed and the common racing control table 16 based on the combination of common control classifications and performs racing control between operations inherent to the system from the interface inherent to the system, that is, the maintenance and management terminal (OAM) 4, and operations via the CMIP interface, that is, the OSIP interface control unit 11 and also performs racing control between operations inherent to the system from the OAM 4. In this case, the operation registration tables 17 and 27 register the operations now being executed, therefore may be structured provided in common for both the HOST racing control unit 13 and the OSIP racing control unit 23 and to update each other.

Further, the OAM interface control unit 15 transfers information with the maintenance and management terminal (OAM) 4 and transfers information with the application preprocessing unit 14. This application preprocessing unit 14 transfers operations inherent to the system due to commands from the maintenance and management terminal 4 to the HOST racing control unit 13, i.e., common racing control unit, and thereby it makes to perform the control. When the result of the control is allowable, it makes the application execution unit 12 execute the operations.

Further, FIG. 2 shows the format of a command. In this figure, the lower layer information field shows, for CMIP information data unit, the message transfer control information of a sixth or lower layer of the OSI model. Further, the CMIP operation field in the CMIP/CMIS information region is a field for designating what operation is requested. In this field, in correspondence with the above M-GET, M-CANCEL-GET, M-SET, M-CREATE, M-DELETE, M-ACTION, M-EVENT-REPORT, etc., (i) an object class indicating the class to which an actual object to be controlled of the operation belongs, (ii) an object instance indicating the actual object to be controlled of the operation, and (iii) application data indicating the data necessary for the execution of the application are contained.

Further, the commands inherent to the system which are input from the maintenance and management terminal 4 have a format of, for example:

CMC: AID: PRM, PRM (parameter), . . . ; Note that CMC is a command code and is composed of a verb-noun indicating what operation (verb) is to be carried out for the operation category (noun). Further, AID is an access ID and indicates the actual object to be controlled by the operation. Further, PRM indicates a parameter, but sometimes indicates the actual object to be controlled.

For example, when the command inherent to the system is:

ENT-EQPT (equipment): . . . ;

the verb ENT (enter) corresponds to the CMIP operation M-CREATE, and the noun EQPT indicates the actual object to be controlled, that is, the equipment. Accordingly, it corresponds to a command for addition of an apparatus. Similarly, in the case of a command inherent to the system:

DLT-SUB: . . . ;

the verb DLT corresponds to the CMIP operation M-DELETE, and the noun SUB indicates the actual subject to be controlled, that is, the subscriber, and corresponds to a command for deletion of a subscriber.

FIG. 3 is an explanatory view of an example of correspondence between a CMIP operation and a command verb. For example, M-GET of the CMIP operation indicating reading of the attribute value controlled corresponds to the verb RETRIEVE (RTRV) of the commands inherent to the system, while M-CANCEL-GET indicating cancellation corresponds to ABORT. Further, M-CREATE indicating the generation of a managed object corresponds to ENT. M-DELETE indicating deletion of the managed object corresponds to DELETE (DLT). Note, M-EVENT-REPORT of the CMIP operation is used for autonomous reports of alarms and states, therefore does not correspond to a verb of the commands inherent to the system. In this way, correspondence, in classifications of control, can be established between the CMIP operations and operations inherent to the system.

FIGS. 4A and 4B are explanatory views of a racing control table of an embodiment of the present invention and shows an example of the racing control table 26 for racing control between CMIP operations in FIG. 1. This racing control table is referred to for the racing control in the OSIP racing control unit 23 when the managed object instances indicating the actual object to be controlled of the operations now being executed and the newly requested operations, are the same as each other, establishes correspondence between the newly requested operation classifications M-CREATE, M-DELETE, M-SET, M-GET, and M-ACTION with the operation classifications M-CREATE, M-DELETE, M-SET, M-GET, and M-ACTION now being executed, and stores the information of whether or not newly requested operations may be executed and messages.

Further, "OSI TOOL CORE" in the racing control table 26 indicates the processing in the case of checking for the existence of the required information in accordance with the classification of the CMIP operation in the open system interconnection tool core unit 24. The "OSI TOOL CORE" also indicates that the relationship between the CMIP operation M-CREATE now being executed and another newly requested CMIP operation and the relationship between the newly requested CMIP operation M-CREATE and another CMIP operation now being executed can be determined by identifying the CMIP operation now being executed in the open system interconnection tool core unit "OSI TOOL CORE" 24. Further, "RACING CONTROL" indicates that racing control is being carried out in the OSIP racing control unit 23.

For example, when the newly requested M-DELETE is input with respect to the M-CREATE now being executed, the open system interconnection tool core unit 24 can identify the fact that the CMIP operation M-CREATE is now in execution by referring to for example the operation registration table 27, therefore since it is an opposite operation (create vs delete) with respect to the same managed object instance, sends a message "NO SUCH INSTANCE" indicating, as ERROR, that there is no such instance to the OSI/CMIP protocol control unit 25.

Further, when a newly requested M-CREATE is input with respect to an M-DELETE now being executed, the open system interconnection tool core unit 24 sends a message "ALREADY CREATED" indicating, as ERROR, that it has been already generated when the operation now being executed is other than the same M-CREATE as the newly requested operation, while makes it perform the racing control in the OSIP racing control unit 23 via the object execution unit 22 when the newly requested operation and the operation now being executed are the same M-CREATE.

Further, when a newly requested M-CREATE is input with respect to an M-CREATE now being executed, the OSIP racing control unit 23 refers to the racing control table 26 and sends a message "PROCESSING FAILURE" indicating a processing failure. Namely, it will refuse the execution with respect to the newly requested M-CREATE. Further, when a newly requested M-GET is input with respect to an M-GET now being executed, since multiple reading operations are possible, the result of the racing control becomes a continuation of the normal operation (NORMAL OPERATION CONTINUES) and execution of this newly requested M-GET is allowed.

FIGS. 5A and 5B are explanatory views of the common racing control table of an embodiment of the present invention and show an example of the common racing control table 16 referred to by the HOST racing control unit 13 in FIG. 1. It specifically shows a case where, by using the correspondence between CMIP operations and commands inherent to the system of FIG. 3, a correspondence is established with classifications of control of commands inherent to the system. Namely, it shows the case of establishing correspondence between classifications of CMIP operations with classifications of control of commands inherent to the system, combine ENT, DLT, EDT (edit), RST (restore), RMV (remove), RTRV, and TEST now being executed and ENT, DLT, EDT, RST, RMV, RTRV, and TEST of newly requested verbs, and store information on whether newly requested verb may be executed and messages such as the error message "PROCESSING FAILURE".

For example, when the command (verb) now being executed and a newly requested command (verb) are the same ENT (corresponding to M-CREATE of CMIP operation) and DLT (corresponding to M-DELETE of the CMIP operation), the HOST racing control unit 13 refers to the common racing control table 16 and sends the message of processing failure "PROCESSING FAILURE". Similarly, in the case of EDT, RST, and RMV (corresponding to M-SET of CMIP operation), it sends the message of processing failure "PROCESSING FAILURE". Namely, it refuses execution of the newly requested operation.

Further, when the command verb now being executed and the newly requested command verb are the same RTRV or TEST (corresponding to M-GET or M-ACTION of CMIP operation), normal processing continues. Namely, execution will be allowed for the newly requested operation. Further, when the command verb now being executed is ENT and the newly requested command verb is RTRV (corresponding to M-GET of CMIP operation), it sends a message indicating, as ERROR, that such an instance does not exist, i.e., "NO SUCH INSTANCE".

FIGS. 6A and 6B are explanatory views of a common racing control table of an embodiment of the present invention and shows a case of establishing correspondence between classifications of control of operations inherent, to the system with classifications of CMIP operations, conversely to FIG. 5. Namely, it shows the case of combining M-CREATE, M-DELETE, M-SET, M-GET, and M-ACTION as verbs now being executed and M-CREATE, M-DELETE, M-SET, M-GET, and M-ACTION as newly requested verbs and storing information of whether a newly requested verb may be executed and messages such as error messages.

FIGS. 7A and 7B are flow charts of a first example of the present invention and shows the processing of the HOST racing control unit 13 in FIG. 1. For example, it shows a case of racing control, by using for example the common racing control table 16 shown in FIGS. 5A and 5B, between CMIP operations and operations inherent to the system or racing control between operations inherent to the system.

The input information to this HOST racing control unit 13 includes any or all information of the display of the origin of the request indicating whether it is a CMIP or command inherent to the system, CMIP sequence number or call ID (INVOKE ID), verb and noun of the command inherent to the system, and external expression of the resource to be controlled. Further, in the operation registration table 17, information similar to the above input information is set in correspondence with the operations now being executed. Note that when there are no operations now being executed, the content of registration becomes zero.

Further, the HOST racing control unit 13 checks, when activated by the OSIP interface control unit 11 or the application preprocessing unit 14, whether or not the controlled object or actual object containing the controlled object is the same as the operation which has already been executed (same meaning as now being executed) based on the input information. Namely, it fetches the operation information now being executed registered in the operation registration table 17 (A1).

Next, it is determined whether or not both of an operation now being executed and a newly requested operation are operations having the same external expression (object instance) (A2). When they are different, the operation routine shifts to step (A6), while when they are the same, it is determined whether or not the nouns or noun groups of the operation now being executed and the newly requested operation are the same (A3).

In this determination, when they are different, the operation routine shifts to step (A6), while when they are the same, the possibility of racing is checked for the verb or group thereof according to for example the common racing control table shown in FIGS. 5A and 5B (A4). Next, it is determined whether or not the input operation is allowable (A5). For example, if the verb of the newly requested classification of control is DLT when the verb of classification of control now being executed is TEST, it will be determined as not allowable, while if the newly requested verb is RTRV, it becomes allowable. In the case of not being allowable, the display of "not allowable" is set as the output (OUTPUT) of the HOST racing control unit 13 (A9).

Further, when the determination of the above (A5) is allowable, it is determined whether or not the check of all operations now being executed has ended (A6). When it has not ended, the operation routine shifts to step (A1), where information of one operation which is different from a previous one now being executed is taken out of the operation registration table 17 and the above steps are repeated. On the other hand, when it has ended, the newly requested operation is registered in the operation registration table 17 (A7) and the display of "allowable" is set as the output (OUTPUT) of the HOST racing control unit 13 (A8). By this, the newly requested operation is sent to the application execution unit 12 via the OSIP interface control unit 11 or the application preprocessing unit 14 and then the newly requested operation is executed.

Further, when the processing in the application execution unit 12 is ended, since the operation is no longer being executed, the operation information is deleted from the operation registration table 17 by using, as a search key, the CMIP sequence number or call ID (INVOKE ID).

FIGS. 8A and 8B are flow charts of a second example of the present invention and shows the processing of the HOST racing control unit 13 in FIGS. 1A and 1B. Specifically, it shows a case of racing control between CMIP operations and the commands inherent to the system or racing control between commands inherent to the system, by using for example the common racing control table shown in FIGS. 6A and 6B.

The information, input to the HOST racing control unit 13 from the OSIP interface control unit 11 or the application preprocessing unit 14, includes any or all of (i) the information on the display of the origin of request indicating whether it is a CMIP or command inherent to the system, (ii) CMIP sequence number or call ID (INVOKE ID), (iii) CMIP operation, and (iv) the external expression of the resource. Information on one operation now being executed is read from the operation registration table 17 (B1) and it is determined whether or not the external expression (object instance) is the same between the requested operation and the operation now being executed (B2). When they are different, the operation routine shifts to step (B5), while when they are the same, the check of possibility of racing is carried out, regarding the CMIP operation (B3), according to for example the common racing control table shown in FIG. 6.

Next, it is determined whether or not the operation is allowable (B4). When not allowable, for example, if the verb now being executed corresponds to M-SET and the newly requested verb corresponds to M-DELETE, the determination of racing control is that the newly requested operation is not allowable and the display of "not allowable" is set as the output (OUTPUT) of the HOST racing control unit 13 (B8).

Further, when the determination of the above (B4) is "not allowable", for example, when the verb now being executed corresponds to M-SET and newly requested verb corresponds to M-GET, the determination of racing control is that the normal operation is to be continued. Namely, the operation becomes allowable in this racing decision. Next, it is determined whether or not the check has ended for all operations now being executed (B5). When it has not been ended, the operation routine shifts to step (B1), while when it has been ended, information of one operation which is different from the previous one is taken out of the operation registration table 17 and the above steps are repeated. When it has been ended, the operation information is registered in the operation registration table 17 (B6), the display of "allowable" is set in the output (OUTPUT) (B7), and thereby the racing control is terminated.

Further, when the application processing is ended, similar to the case mentioned above, since the operation is no longer being executed, the information of the operation is deleted from the operation registration table 17 with the CMIP sequence number or call ID (INVOKE ID) as the search key.

FIGS. 9A and 9B are flow charts of a third example of the present invention and shows the processing in the OSIP racing control unit 23 in FIGS. 1A and 1B. The information, input from the object execution unit 22 to the OSIP racing control unit 23, includes (i) the information of display of the origin of the request indicating whether it is a CMIP or command, (ii) CMIP sequence number, (iii) information of the CMIP operation classification, (iv) object class to be controlled, and (v) the object instance. Further, in the operation registration table 27, the information of the operation now being executed corresponding to this input information is registered.

Further, the OSIP racing control unit 23 reads one operation now being executed from the operation registration table 27 according to the above input information (C1) and determines whether or not the object instances of the operation now being executed and the newly requested operation are the same (C2).

When the object instances are different, the operation routine shifts to step (C5), while when the object instances are the same, the possibility of racing is checked, regarding the CMIP operation classification, according to the racing control table 26 shown in FIGS. 4A and 4B. For example, when the operation now being executed is M-GET and the newly requested operation is M-DELETE, it is determined that the latter is not allowable and the display of "not allowable" is set as the output (OUTPUT) of the OSIP racing control unit 23 (C8). Further, when the operation now being executed is M-GET and the newly requested operation is M-SET, it is determined that this M-SET can be allowed.

When the newly requested operation can be allowed, it is determined whether or not the check has ended for all operations now being executed (C5). When it has not ended, the operation routine shifts to step (C1), where the above steps are repeated. On the other hand, when it has ended, the operation information is registered in the operation registration table 27 (C6), the display of "allowable" is set as the output (OUTPUT) of the OSIP racing control unit 27 (C7), and thereby the racing control is terminated. Also in this case, when the application processing is terminated, the operation is no longer being executed, therefore the information of this operation is deleted from the operation registration table 27 by using the CMIP sequence number as the search key.

As explained above, racing control between CMIP operations is carried out in the OSIP racing control unit 23, and racing control between CMIP operations and operations inherent to the system and between operations inherent to the system, is carried out in the HOST racing control unit 13. When the object instances are the same, fine racing control becomes possible by referring to the racing control table 26 or common racing control table 16.

Further, the HOST racing control unit 13 determines, regarding the CMIP operations and operations inherent to the system, the identity of the controlled object resource expressions and the identity or resemblance of categories of the controlled object resources. When they are the same or similar, the possibility of execution of a newly requested operation can be determined based on the classification of control or the control classification group of both the operation now being executed and the newly requested operation. In this case as well, the possibility of execution of the newly requested operation can be determined by referring to the operation registration table 17 and the common racing control table 16.

Further, it is possible to log the input information concerning the racing control between CMIP operations and operations inherent to the system by common external expressions in the HOST racing control unit 13 and information of the result of racing control. Such a logging information can be stored in a memory (not illustrated) etc. under the control of the HOST racing control unit 13. This logging information becomes useful for supervision etc. of the CMIP operations and operations inherent to the system under different protocols.

As explained above, the present invention controls racing between CMIP operations, between CMIP operations and operations inherent to the system, or between operations inherent to the system, by determining whether the objects of control such as the managed object instances are the same regarding the operations now being executed and the newly requested operations. When they are the same, it refers to the racing control table 26 or the common racing control table 16 storing the decision information of the possibility of execution or messages, by using combinations of classifications of control to determine whether or not the execution of a newly requested operation can be allowed. Therefore, it has the advantage that system management can be quickly and finely carried out in comparison with the case of the related art where racing control is carried out in correspondence with groups of internal commands.

Particularly, when system management is carried out with a mixture of CMIP operations and operations inherent to the system, no matter which operation is now being executed, there is the advantage that it is easy to determine the possibility of execution of the newly requested operations and smoothly maintain and manage the system, by using the common controlled objects and control classifications.

While the invention has been described by reference to specific embodiments chosen for purposes of illustration, it should be apparent that numerous modifications could be made thereto by those skilled in the art without departing from the basic concept and scope of the invention.

What is claimed is:

1. A method of racing control in system management including the steps of determining, regarding newly requested operations under the Common Management Information Protocol (CMIP) defined by an Open System Interconnection (OSI) model for switching systems, if a managed object instance of CMIP operations now being executed and a managed object instance specified by the newly requested CMIP operations are different or the same and, when the instances are different, allowing execution of the newly requested CMIP operations, and, when the instances are the same, referring to a racing control table formed based on a combination of operation classifications to determine whether it is possible to execute the newly requested CMIP operations, said method further comprising the steps of:

Registering the CMIP operations now being executed in an operation registration table:

storing information in the racing control table indicating if newly requested CMIP operations may be executed by using combinations of classifications of newly requested and now being executed CMIP operations; and extracting the CMIP operations now being executed from the operation registration table upon newly requested CMIP operations.

2. A method of racing control in system management including the steps of determining, regarding first newly requested operations of operations under the Common Management Information Protocol (CMIP) defined by the Open System Interconnection (OSI) model for switching systems or second newly requested operations of a format inherent to a system manufacturer or of a format inherent to a particular system, if an external expression establishing correspondence between managed object instances of CMIP operations and resources to be controlled of operations inherent to the system is different or the same as the external expression of the operations now being executed, when they are different, allowing the execution of the newly requested operations, and when they are the same, establishing correspondence of a classification of CMIP operations with a classification of control of operations of a format inherent to a system manufacturer or of a format inherent to a particular system, and referring to a common racing control table formed based on combinations of the latter classifications of control to determine whether it is possible to execute the newly requested operations, said method further comprising the steps of:

registering the operations now being executed in an operation registration table;

storing information in the racing control table indicating if newly requested CMIP operations, or newly requested operations of a format inherent to a system manufacturer or of a format inherent to a particular system, may be executed by using combinations of classifications of newly requested operations and now being executed operations, and extracting the operations now being executed from the operation registration table upon newly requested operations.

3. A method of racing control in system management including the steps of determining, regarding first newly requested operations of operations under the Common Management Information Protocol (CMIP) defined by the Open System Interconnection (OSI) model for switching systems or second newly requested operations of a format inherent to a system manufacturer or of a format inherent to a particular system, if an external expression establishing correspondence between managed object instances of CMIP operations and resources to be controlled of operations inherent to the system is different or the same as an external expression of the operations now being executed, when they are different, allowing the execution of the newly requested operations, and when they are the same, establishing correspondence of a classification of CMIP operations with the classification of control of operations inherent to the system and referring to a common racing control table formed based on combinations of the former classifications of CMIP operations to determine whether it is possible to execute the newly requested operations, said method further comprising the steps of:

registering the operations now being executed in an operation registration table;

storing information in the racing control table indicating if newly requested CMIP operations, or newly requested operations of a format inherent to a system manufacturer or of a format inherent to a particular system, may be executed by using combinations of classifications of newly requested operations and now being executed operations; and extracting the operations now being executed from the operation registration table upon newly requested operations.

4. A system of racing control in system management by a Common Management Information Protocol (CMIP) operations defined by the Open System Interconnection (OSI) model for switching systems, provided with:

an operation registration table for registering operations now being executed;

a racing control table for storing information indicating if newly requested operations may be executed by using combinations of classifications of newly requested and now being executed CMIP operations; and a racing control unit including a first means for extracting CMIP operations now being executed from the operation registration table upon newly requested CMIP operations, a second means for determining if a managed object instance of the CMIP operations now being executed extracted by this first means and a managed object instance of the newly requested CMIP operations are the same, and a third means for, when it is determined by this second means that they are the same, determining if the newly requested CMIP operations can be executed by referring to the racing control table, wherein the common racing control table is structured to establish correspondence for classifications of control of operations of a format inherent to a system manufacturer or of a format inherent to a particular system with classifications of operations of the CMIP, and to store information indicating if the newly requested operations may be executed by using combinations of classifications of operations now being executed and classifications of the newly requested operations.

5. A system of racing control in system management by a first operations under a Common Management Information Protocol (CMIP) defined by the Open System Interconnection (OSI) model for switching systems and second operations of a format inherent to a system manufacturer or of a format inherent to a particular system, provided with:

an operation registration table for registering operations now being executed; a common racing control table for establishing correspondence between classifications of operations of CMIP and classifications of control of operations of a format inherent to a system manufacturer or of a format inherent to a particular system, and storing information indicating if newly requested operations may be executed; and a racing control unit including a first means for extracting operations now being executed from the operation registration table upon newly requested operations, a second means for determining if an external expression corresponding to a managed object instance of the CMIP operations now being executed by this first means and the external expression of the newly requested operations are the same, and a third means for, when it is determined that they are the same by this second means, determining if the newly requested operations may be executed by referring to the common racing control table, wherein the common racing control table is structured to establish correspondence for classifications of control of operations of a format inherent to a system manufacturer or of a format inherent to a particular system with classifications of operations of the CMIP, and to store information indicating if the newly requested operations may be executed by using combinations of classifications of operations now being executed and classifications of the newly requested operations.

6. A system of racing control in system management by a first operations under a Common Management Information Protocol (CMIP) defined by the Open System Interconnection (OSI) model for switching systems and second operations of a format inherent to a system manufacturer or of a format inherent to a particular system, provided with:

an operation registration table for registering operations now being executed; a common racing control table for establishing correspondence between classifications of operations of CMIP and classifications of control of operations of a format inherent to a system manufacturer or of a format inherent to a particular system, and storing information indicating if newly requested operations may be executed; and a racing control unit including a first means for extracting operations now being executed from the operation registration table upon newly requested operations, a second means for determining if an external expression corresponding to a managed object instance of the CMIP operations now being executed by this first means and the external expression of the newly requested operations are the same, and a third means for, when it is determined that they are the same by this second means, determining if the newly requested operations may be executed by referring to the common racing control table, wherein the common racing control table is structured to establish correspondence for classifications of operations of the CMIP with classifications of control of operations of a format inherent to a system manufacturer or of a format inherent to a particular system, and to store information indicating if the newly requested operations may be executed by using combinations of classifications of control of operations now being executed and classifications of control of the newly requested operations.

7. A system of racing control in system management by a first operations under a Common Management Information Protocol (CMIP) defined by the Open System Interconnection (OSI) model for switching systems and second operations of a format inherent to a system manufacturer or of a format inherent to a particular system, provided with:

an operation registration table for registering operations now being executed; a common racing control table for establishing correspondence between classifications of operations of CMIP and classifications of control of operations of a format inherent to a system manufacturer or of a format inherent to a particular system, and storing information indicating if newly requested operations may be executed; and a racing control unit including a first means for extracting operations now being executed from the operation registration table upon newly requested operations, a second means for determining if an external expression corresponding to a managed object instance of the CMIP operations now being executed by this first means and the external expression of the newly requested operations are the same, and a third means for, when it is determined that they are the same by this second means, determining if the newly requested operations may be executed by referring to the common racing control table, wherein the racing control unit is structured to determine, regarding CMIP operations and operations of a format inherent to a system manufacturer or of a format inherent to a particular system, if the newly requested operations may be executed, based on identity of expressions of resources to be controlled, identity or resemblance of categories of resources to be controlled, and the classifications of control or groups of classifications of control of operations now being executed and the newly requested operations.

8. A system of racing control in system management by a Common Management Information Protocol (CMIP) operations defined by the Open System Interconnection (OSI) model for switching systems, provided with:

an operation registration table for registering operations now being executed;

a racing control table for storing information indicating if newly requested operations may be executed by using combinations of classifications of newly requested and now being executed CMIP operations; and a racing control unit including a first means for extracting CMIP operations now being executed from the operation registration table upon newly requested CMIP operations, a second means for determining if a managed object instance of the CMIP operations now being executed extracted by this first means and a managed object instance of the newly requested CMIP operations are the same, and a third means for, when it is determined by this second means that they are the same, determining if the newly requested CMIP operations can be executed by referring to the racing control table, wherein the common racing control table is structured to establish correspondence for classifications of operations of the CMIP with classifications of control of operations of a format inherent to a system manufacturer or of a format inherent to a particular system, and to store information indicating if the newly requested operations may be executed by using combinations of classifications of control of operations now being executed and classifications of control of the newly requested operations.

9. A system of racing control in system management by a Common Management Information Protocol (CMIP) operations defined by the Open System Interconnection (OSI) model for switching systems, provided with:

an operation registration table for registering operations now being executed;

a racing control table for storing information indicating if newly requested operations may be executed by using combinations of classifications of newly requested and now being executed CMIP operations; and a racing control unit including a first means for extracting CMIP operations now being executed from the operation registration table upon newly requested CMIP operations, a second means for determining if a managed object instance of the CMIP operations now being executed extracted by this first means and a managed object instance of the newly requested CMIP operations are the same, and a third means for, when it is determined by this second means that they are the same, determining if the newly requested CMIP operations can be executed by referring to the racing control table, wherein the racing control unit is structured to determine, regarding CMIP operations and operations of a format inherent to a system manufacturer or of a format inherent to a particular system, if the newly requested operations may be executed, based on identity of expressions of resources to be controlled, identity or resemblance of categories of resources to be controlled, and the classifications of control or groups of classifications of control of operations now being executed and the newly requested operations.

* * * * *